United States Patent
Byren et al.

(10) Patent No.: US 8,660,324 B2
(45) Date of Patent: Feb. 25, 2014

(54) TEXTURED PATTERN SENSING USING PARTIAL-COHERENCE SPECKLE INTERFEROMETRY

(75) Inventors: Robert W. Byren, Manhattan Beach, CA (US); Robin Reeder, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 485 days.

(21) Appl. No.: 12/749,344

(22) Filed: Mar. 29, 2010

(65) Prior Publication Data
US 2011/0235871 A1    Sep. 29, 2011

(51) Int. Cl.
*G06K 9/00*    (2006.01)

(52) U.S. Cl.
USPC ............................ 382/124; 382/325; 356/511

(58) Field of Classification Search
USPC ........................... 382/100, 124, 325; 356/511
See application file for complete search history.

(56) References Cited

U.S. PATENT DOCUMENTS

| | | |
|---|---|---|
| 4,053,228 A | 10/1977 | Schiller |
| 4,569,080 A | 2/1986 | Schiller |
| 4,652,131 A | 3/1987 | Fercher et al. |
| 5,109,427 A | 4/1992 | Yang |
| 5,241,606 A | 8/1993 | Horie |
| 5,293,873 A | 3/1994 | Fang |
| 5,675,407 A | 10/1997 | Geng |
| 5,706,085 A | 1/1998 | Blossey et al. |
| 5,870,196 A | 2/1999 | Lulli et al. |
| 5,892,575 A | 4/1999 | Marino |
| 5,973,784 A * | 10/1999 | Szwaykowski et al. ...... 356/495 |
| 6,255,641 B1 | 7/2001 | Johnson |
| 6,485,981 B1 | 11/2002 | Fernandez |
| 6,678,632 B1 | 1/2004 | Iannarilli, Jr. |
| 6,834,798 B2 | 12/2004 | Bove et al. |
| 6,879,712 B2 | 4/2005 | Tuncay et al. |
| 7,248,344 B2 | 7/2007 | Morcom |
| 7,301,608 B1 | 11/2007 | Mendenhall et al. |
| 7,705,337 B2 | 4/2010 | Gibson |
| 7,817,256 B2 | 10/2010 | Fuji et al. |
| 8,036,431 B1 | 10/2011 | Fisher et al. |
| 8,265,375 B2 | 9/2012 | Shirley |
| 2002/0016533 A1* | 2/2002 | Marchitto et al. ............ 600/310 |
| 2002/0097896 A1 | 7/2002 | Kuckendahl |
| 2003/0137669 A1* | 7/2003 | Rollins et al. ................. 356/479 |

(Continued)

OTHER PUBLICATIONS

Rao et al, "Study of engineering surfaces using laser-scattering techniques" Sadhana, vol. 28, Issue 3, Issn: 0256-2499, Springer India, in co-publication with Indian Academy of Sciences, Jun. 1, 2003, pp. 739-761.*

(Continued)

*Primary Examiner* — Aaron W Carter
(74) *Attorney, Agent, or Firm* — Pierce Atwood LLP; Joseph M. Maraia

(57) ABSTRACT

A system for imaging a textured surface includes a light source that is configured to project an electromagnetic radiation beam onto the textured surface, wherein the projected beam generates first radiation reflected from a first portion of the textured surface to form a speckle pattern, and second radiation reflected from a second portion of the textured surface which is substantially uniform in intensity. The reflected first and second reflected radiation is received by an optical detector, and may be processed to generate an image of the textured surface from the first and second reflected radiation. Methods for textured surface sensing are also disclosed.

19 Claims, 10 Drawing Sheets

(56) References Cited

U.S. PATENT DOCUMENTS

| | | | |
|---|---|---|---|
| 2004/0100631 A1* | 5/2004 | Bashkansky et al. | 356/342 |
| 2004/0152989 A1* | 8/2004 | Puttappa et al. | 600/473 |
| 2007/0263208 A1* | 11/2007 | Yelin et al. | 356/307 |
| 2008/0123106 A1 | 5/2008 | Zeng et al. | |
| 2008/0154524 A1* | 6/2008 | Shirley | 702/66 |
| 2009/0027689 A1* | 1/2009 | Yun et al. | 356/511 |
| 2009/0054788 A1 | 2/2009 | Hauger et al. | |
| 2009/0257106 A1* | 10/2009 | Tan et al. | 359/279 |
| 2010/0128109 A1 | 5/2010 | Banks | |
| 2011/0235871 A1 | 9/2011 | Byren et al. | |

OTHER PUBLICATIONS

Cheng et al. "Artificial fingerprint recognition by using optical coherence tomography with autocorrelation analysis" Applied Optics, vol. 45, No. 36, pp. 9238-9245, Dec. 20, 2006.*

Gossage et al. "Texture analysis of optical coherence tomography images: feasibility for tissue classification" Journal of Biomedical Optics 8(3), pp. 570-575 (Jul. 2003).*

Agrawal, Amit et al., "An Algebraic Approach to Surface Reconstruction from Gradient Fields," (2005).

Aull, B.F. et al., "Geiger-Mode Avalanche Photodiodes for Three-Dimensional Imaging," vol. 13, No. 2, Lincoln Lab. Journal, pp. 335-350, (2002).

Byren, R.W., "Laser Rangefinders," The Infrared and Electro-Optical Sys. Handbook, Infrared Info. Analysis Center and SPIE, vol. 6, pp. 79-82, 90-92 (1993).

Coffey, V. C., "Thin-Disk Laser Oscillator Generates Record-Energy Short Pulses," Laser Focus World, pp. 37-39 (May 2008).

Frankot, R. et al., "A Method for Enforcing Integrability in Shape from Shading Algorithms," IEEE Transactions on Pattern Analysis and Machine Intelligence, vol. 4, pp. 439-451 (1988).

Hergert, Earl et al., "APD Arrays: Geiger-mode APD arrays detect low light," Penwell Corp. (2008).

Koechner, W., "Solid-State Laser Eng'g," 2d ed., Springer Verlag, pp. 211-215 (1988).

Miyazaki, Daisuke et al., "Polarization-Based Inverse Rendering from a Single View," IEEE 0-7695-1950-4/03 (2003).

Mounier, D. et al., "Application of Transient Femtosecond Polarimetry/Ellipsometry Technique in Picosecond Laser Ultrasonics," IOP Publ'g Ltd., pp. 1-4 (2007).

NIST Special Publication 500-245 "American Nat'l Standard for Info. Sys.—Data Format for the Interchange of Fingerprint, Facial, and Scar Mark & Tatoo (SMT) Info.," ANSI/NIST-ITL 1 2000, p. 5 (2000).

NIST Special Publication 500-271 "American Nat'l Standard for Info. Sys.—Data Format for the Interchange of Fingerprint, Facial, and Other Biometric Information," ANSI/NIST-ITL 1 2007, p. 11, 2007.

Rahmann, Stefan et al., "Reconstruction of Specular Surfaces Using Polarization Imaging," IEEE 0-7695-1272-0/01, I-149-155 (2001).

Reid, Robert B., et al, "Quantifying Surface Normal Estimation," SPIE vol. 6240, pp. 624001-1-624001-11 (2006).

Sadjadi, Firooz "Remote Sensing, Passive Three-Dimensional Sensing by Polarimetric Imaging," SPIE (2006).

Sadjadi, Firooz et al., "Extraction of Surface Normal & Index of Refraction Using a Pair of Passive Infrared Polarimetric Sensors," IEEE 1-4244-1180-7/07 (2007).

Stucker, M. et al., "Interpapillary Lines—the Variable Part of the Human Fingerprint," Journal of Forensic Sciences, vol. 46, Issue 4 (Jul. 2001).

Tyo, J. Scott et al., "The Effects of Thermal Equilibrium & Contrast in LWIR Polarimetric Images," OSA, vol. 15, No. 23 (2007).

Wolf, Lawrence B. et al., "Constraining Object Features Using a Polarization Reflectance Model," IEEE Transactions on Pattern Analysis & Machine Intelligence, vol. 13, No. 7, pp. 635-657 (1991).

Wolf, Lawrence B., "Image Understanding from Thermal Emission Polarization," IEEE Computer Society Conf. on Computer Vision & Pattern Recognition, 0-8186-8497-6/98, pp. 625-631 (1998).

Wolf, Lawrence B., "Shape from Polarization Images," IEEE Computer Society Workshop on Computer Vision, TH0210-5/87/0000/0079, pp. 79-85 (1987).

Wolf, Lawrence B., "Spectral & Polarization Stereo Mehtods Using a Single Light Source," Proceedings, ICCV, pp. 810-820 (1987).

Wu, Tai-Pang et al., "Visible Surface Reconstruction from Normals with Discontinuity Consideration," Proceedings of the IEEE Computer Society Conf.on Computer Vision and Pattern Recognition, pp. 1793-1800, (2006).

Zhou, Y. T. et al., "Edge Detection and Linear Feature Extraction Using a 2-D Random Field Model," IEEE Transactions on Pattern Analysis and Machine Intelligence, vol. 11, No. 1, pp. 84-85 (1989).

Balboa, IL, et al., "Low-coherence Optical Fiber Speckle Interferometry", Meansurement Science and Technology, IOP, Bristol, GB, vol. 17, No. 4, pp. 605-616 (2006).

* cited by examiner

Textured Pattern Height Profile

Partial Coherence Speckle Image 1

Partial Coherence Speckle Image 2

Absolute Value of Image 1
Subtracted from Image 2

TEXTURED PATTERN SENSING USING PARTIAL-COHERENCE SPECKLE INTERFEROMETRY

BACKGROUND

This application generally relates to textured pattern sensing and detection, and more particularly, sensing and detecting using partial-coherence speckle interferometry.

A need exists in the fields of counterterrorism and law enforcement to identify and track suspected terrorists or felons from a distance, without the suspect's knowledge or cooperation, and without leaving a trail that might alert the suspect that he is under suspicion, and by whom. A number of biometric sensing and tracking concepts have been proposed. For instance, remote fingerprinting has been identified as an attractive means for identifying and tracking of terrorists.

A problem, however, in remote, covert fingerprinting of a suspected terrorist or felon lies in the lack of contrast in detecting characteristics of the fingerprint. For instance, there may be insufficient differentiation in the reflectivity, emissivity, or polarization signature between the high points (or ridges) and the low points (or valleys) of the dermal papillae to meet needs under a broad range of conditions.

This problem results because passive sensors typically require some intensity, spectral, polarimetric, or other form of image contrast to differentiate ridges from valleys in the dermal papillae. The subtle natural differentiation based on passive signatures may prove insufficient for discrimination, except under very unusual conditions (e.g., shallow illumination grazing angles adequate to produce shadows). Systems exist that create unnatural differentiation by selectively adding an artificial pigment to either the ridges or valleys. In fact, this is how traditional ink-on-paper fingerprints are taken.

Commercial 3-D Laser Detection and Ranging (LADAR) sensors based on direct detection pulse-echo ranging techniques are presently used for detection variety of 3-dimensional imaging applications. However, they typically do not have the range resolution necessary to measure the submillimeter height difference between ridges and valleys in the texture pattern of a human finger. Moreover, commercial LADAR sensors which can record fingerprints using range contrast require that the subject place his/her finger on a flat glass optical surface or window which provides a flat datum for a "binary" range determination as to whether the texture feature is at the same range as the datum or not. The binary approach can provide sharp fingerprint detail, but requires the suspect to put his/her hand on a flat optical surface or window for scanning and is therefore not effective for covert, remote fingerprint capture.

Laser-based interferometric approaches to high resolution profilometry might also be considered. These require the use of a coherent light source to interrogate the target and the return signal is optically mixed with a coherent local oscillator signal of the same wavelength in a heterodyne detection process. When the return signal and local oscillator signal are in phase, the mixed signal is strong, due to constructive interference. When the return and local oscillator signals are out of phase, the mixed signal is measurably weaker due to destructive interference. Regions of constructive interference in the interferometric image of the finger appear as higher intensity fringes and are separated by the weaker intensity regions of destructive interference. The difference in height from one fringe to the next is precisely the wavelength of the optical signal. This fringe pattern therefore provides a very accurate measure of 3-D surface features, much like a topographic map, where the fringe lines are equivalent to lines of constant surface elevation. This interferometric approach works well when the surface to be profiled is relatively flat so that the fringe lines are separated by more than a pixel and can be distinguished in the image. Unfortunately, this is not the case with fingers when using a light source in the ultraviolet, visible, or infrared regions of the spectrum.

As a result, these conventional approaches have been generally impractical in real-time terrorist-identification scenarios where equipment cannot be pre-positioned, the range is quite variable, and/or the fingerprint must be taken remotely and covertly. The range variability may arise from several factors: the distance between the sensor and the suspect's fingers is not precisely known, the dermal papillae are on a quasi-cylindrical surface and therefore have depth, and/or the target is in motion.

SUMMARY

In an embodiment, a system for imaging a textured surface comprises: a light source configured to project electromagnetic radiation onto the textured surface, wherein the projected beam generates first radiation reflected from a first portion of the textured surface to form a speckle pattern, and second radiation reflected from a second portion of the textured surface which is substantially uniform in intensity; and an optical detector configured to receive the first and second reflected radiation from the textured surface.

In another embodiment, a method for imaging a textured surface comprises: projecting a beam of electromagnetic radiation onto the textured surface, wherein the projected beam generates first radiation reflected from a first portion of the textured surface to form a speckle pattern, and second radiation reflected from as a second portion of the textured surface which is substantially uniform in intensity; and receiving, with an optical detector, the first and second reflected radiation from the textured surface.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

A methodology for textured pattern sensing and detection is disclosed. According to an embodiment, a light source is configured to project an electromagnetic radiation beam onto a textured surface, wherein the projected beam generates first radiation reflected from a first portion of the textured surface to form a highly modulated speckle pattern, and second radiation reflected from a second portion of the textured surface which is substantially uniform in intensity. The reflected first and second reflected radiation is received by an optical device, which is subsequently processed by a processor to generate an image of the textured surface from the first and second reflected radiation.

A speckle pattern is a random intensity pattern that may be produced by the mutual interference of plural waves having different phases which add together to give a resultant wave whose amplitude and intensity vary randomly. For instance, when a textured surface is illuminated by a coherent light wave, each point thereof acts as a source of secondary waves, and light at any point in the scattered light field is a coherent superposition of waves which have been scattered from each point on the illuminated surface. The amplitude of the resultant electric field is the sum of the electric field amplitudes of these secondary waves and can range from some maximum due to complete constructive interference to zero due to complete destructive interference. Thus, the surface topography results in scattered reflected light randomly varying in intensity.

If the light is partially-coherent, its optical frequency (and wavelength) will not have a single value but will be spread over a finite range, which we assume to have a Gaussian line shape. Such partially-coherent light may be characterized by a coherence length, $l_c$, defined as the optical path length difference at which the fringe visibility of a light beam, which is interfered with itself, is reduced to $2^{-1/2}$. By this definition, the coherence length is equal to 0.64 c/δν, where c is the speed of light in vacuum and δν is the spread in optical frequency between the half power points of the presumed Gaussian line shape. For partially-coherent light, the interference between regions of the surface, which differ in range by more than $l_c$, will be substantially less sharp and the resultant intensity variations will be effectively averaged out.

While reference herein is made to fingerprints, it will be appreciated that the disclosed methodology may be similarly used for detecting other textured dermal surfaces, such as toeprints, footprints, palmprints, etc. Other textured patterns or surfaces may similarly be detected, such as, for example, facial features, woven clothing patterns, and grain patterns of an item, such as leather, wood, metal, ceramic, plastic or other items.

Figure 1A:
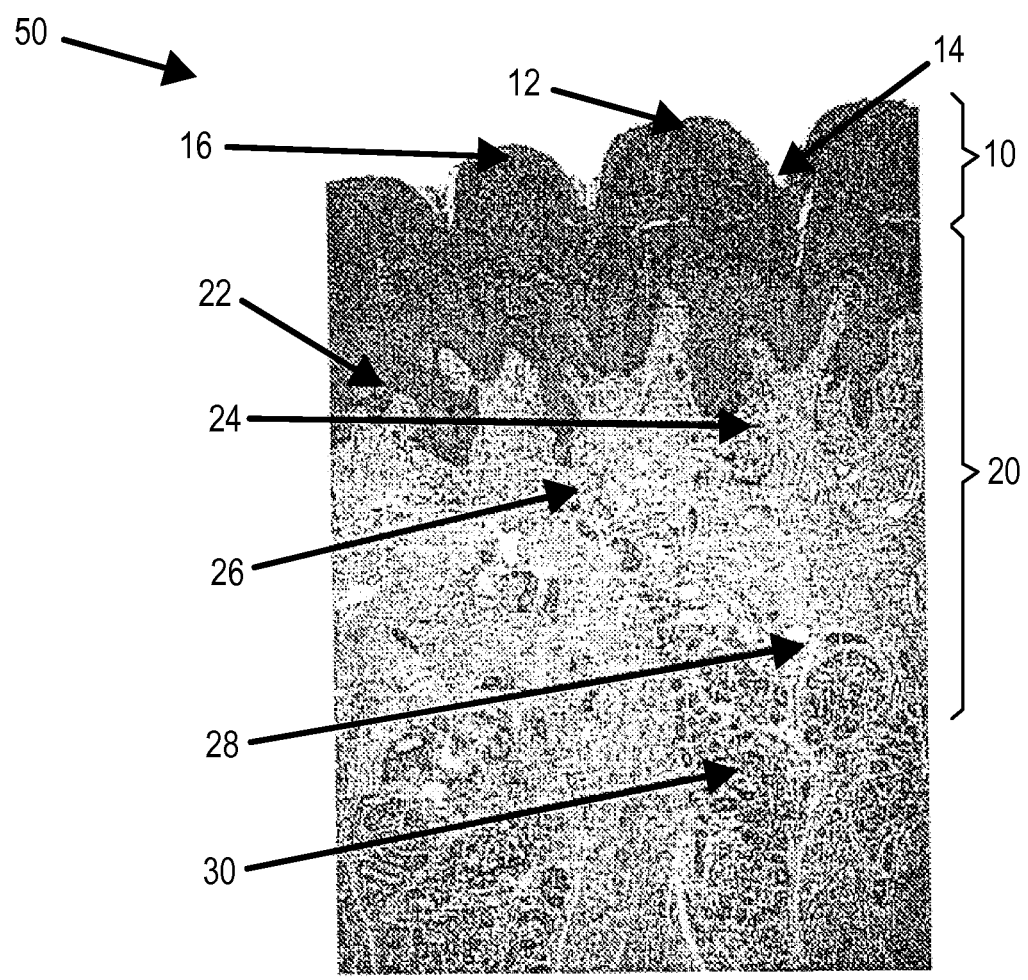
FIG. 1a shows a photograph of the cross-section of a human finger including the physiology of the dermal layers.

FIG. 1a shows a photograph of the cross-section of human finger 50 including the physiology of the dermal layers. Finger 50 includes epidermis 10 and dermis 20 layers of skin. Epidermis 10 is the outer layer of skin and includes the papillary ridges 12, papillary valleys 14, and pores 16. Dermis 20 is located between epidermis 10 and fat cells 30 and includes papilla 22, tactile corpuscles and nerves 24, sweat duct and gland 26, and blood vessels 28. The configuration of papillary ridges 12 and valleys 14 is different for each person, and thus creates a unique fingerprint for each person.

Figure 1B:
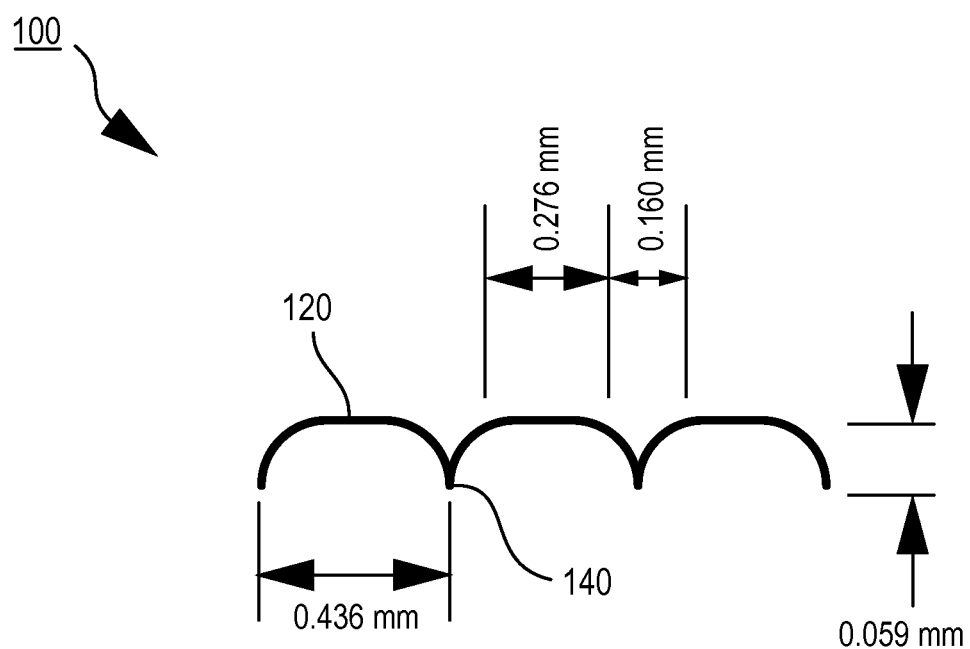
FIG. 1b shows a model of a typical human fingerprint.

FIG. 1b shows a model of human fingerprint 100. The topography of human fingerprints based on laser profilometry has been reported, for example, by M. Stucker, et al., "Interpapillary Lines—The Variable Part of the Human Fingerprint," *Journal of Forensic Sciences*, Vol 46, Issue 4, (July 2001). Their data indicates that human fingerprints have an average papillary ridge height: of 0.0590±0.0192 mm and papillary ridge spacing: 0.4355±0.0574 mm.

The median width of ridges 120, and valleys 140, may be about 0.276 mm and 0.160 mm, respectably. The convolutions defining papillary ridges 120 and papillary valleys 140 are generally not symmetric. Ridges 120 are typically "U" shaped and broader than valleys 140, while the folds in valleys 140 are substantially "V" shaped. This "V" shaped feature leads to partial trapping of incident electromagnetic radiation (light) in valleys and a contrast reduction in valley region 140 relative to the ridge region 120.

Figure 2:
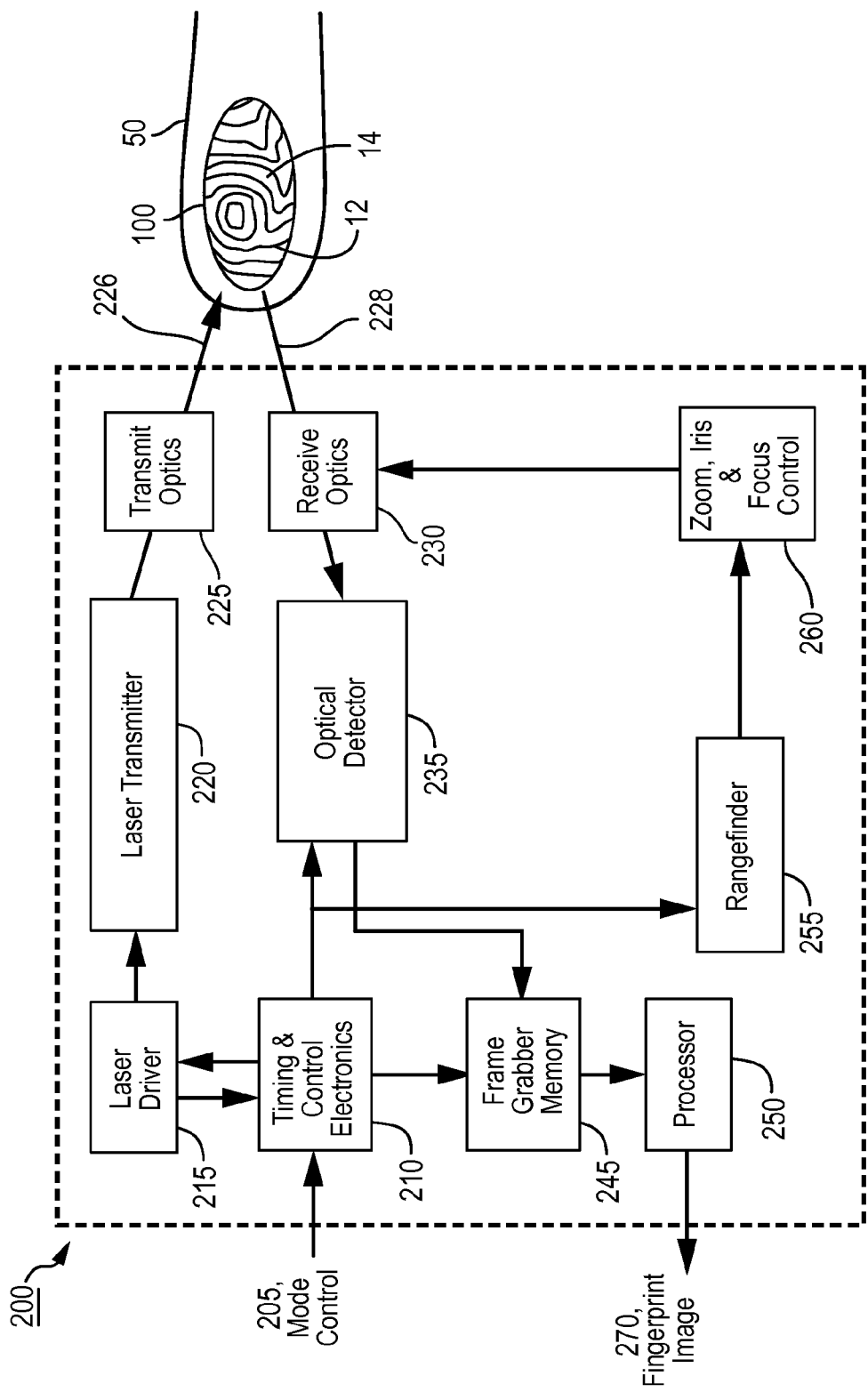
FIG. 2 depicts a block diagram of an exemplary textured pattern sensing system in accordance with an embodiment.

FIG. 2 shows an exemplary textured pattern sensing system 200 for remote, covert fingerprint recording, according to an embodiment. Target finger 50 of a suspect includes a plurality of papilla ridges 12 and valleys 14 which define a unique fingerprint 100. Because a typical finger appears as a diffuse reflector of visible light, the dermal surface has an inner-scale roughness on the order of a micrometer.

Laser driver 215 controls laser transmitter 220 which is configured to provide illumination of target finger 50. In one implementation, laser transmitter 220 may be a partially coherent pulsed solid-state laser transmitter that operates in the near infrared portion of the electromagnetic radiation spectrum beyond the normal photopic response range of the human eye (e.g., greater than 770 nm), but within the spectral response of typical sold-state optical detectors, e.g., silicon charge coupled devices (CODs). For instance, a low-average power laser operating in the visible band may also be undetectable if the ambient light is sufficiently high (e.g., daylight conditions).

Of course, it will be appreciated that other light sources may also be used, such as, laser diodes, light emitting diodes, continuous wave (CW) solid-state lasers, filtered incandescent lamps, atomic vapor lamps, fluorescent tubes, etc. And it will be appreciated that various spectra of light could be used in accordance with the embodiments disclosed herein, such as visible, ultraviolet (UV), or infrared (IR).

Timing and control electronics 210 direct laser driver 215 and laser transmitter 220 to fire and manage the timing of the bias and readout cycles for the optical detector 235. Such systems are known in the art for controlled laser pulse timing. Separate mode control 205 may be used to switch the timing of the laser driver 215 and the frame rate and or format of the optical detector 235 based on the target size, range, reflectivity, surface texture characteristics, atmospheric transmission, and ambient lighting conditions. For example, a dark target surface may require greater pulse energy or a longer dwell time (CW source) to achieve the desired signal-to-noise ratio relative to a lighter target surface. If the laser is a continuously-pumped and Q-switched solid state laser, the Mode Control 205 may command the Timing and Control Electronics 210 to lengthen the period between laser pulses resulting in a higher laser pulse energy and also to reduce the frame rate of the optical detector to maintain synchronization with the new laser pulse rate.

Transmit optics 225 may be provided and configured to shape, focus, and/or correct aberrations of the beam of electromagnetic radiation (light) 226 and direct it towards target finger 50. Receiver optics 230 may include one or more lens, polarizers, filters, etc., as known in the art. The transmit optics 225 and receive optics 230 functions may be combined within a single optical system which may have shared elements such as lenses.

Speckle pattern 228 resulting from scattering the laser beam from the textured surface, such as fingerprint 100, is collected by receiver optics 230 which image speckle pattern 228 onto optical detector 235. Receiver optics 230 may include a narrow bandpass optical filter to minimize reflected solar or thermal background noise. Speckle pattern 228 is sensed by optical detector 235 as an intensity image. In some implementations, optical detector 235 may be a charge coupled device (CCD), photodiode array, camera or other detector sensitive to electromagnetic radiation or light.

The speckle pattern imaged by the optical detector 235 may then be captured by the frame grabber memory 245 or sent directly to processor 250 which extracts features, e.g., corresponding to papillary ridges and valleys of target finger 50. Processor 250 may also read instructions for an algorithm known in the art of forensic and biometric sciences to extract higher-level attributes such as fingerprint class (e.g., whorl, right loop, left loop, arch, and tented arch) and features such as minutiae points (e.g., local ridge characteristics that occur at either a ridge bifurcation of ridge ending) or correlation registration points. The output of processor 250 may include standard video interface format (such as, for example, IEEE RS 170), or a standard computer-interface format (serial or parallel).

The pointing function of textured pattern sensing system 200 may be controlled by using a separate imager and video tracker system (not shown) which may be configured to point the sensor line-of-sight (LOS) toward target finger 50. This pointing function might also be accomplished by the human operator using a small display, such as, for example, a liquid crystal display (LCD) device. With the imager, video tracker, and LOS pointing means, the field-of-view (FOV) of textured pattern sensing system 200 may need only be the size of the target suspect's palm.

Rangefinder 255 may also be included, which drives zoom, iris and focus control servo mechanism 260 attached to receiver optics 230 to (1) maintain fingerprint image 100 in sharp focus on optical detector 235, (2) maintain a near constant pixel spacing between papillary ridges 12, and/or (3) maintain a near constant ratio between the diameter of the receiver point spread function and the size of papillary features in the image plane of the optical detector 235. To maintain focus, the accuracy of rangefinder 255 may be comparable to the depth-of-focus of receiver optics 230. In some implementations, range finder 255 may use a pulse from laser transmitter 220, a fast photodiode (not shown), and a conventional range counter to measure the time of flight of the laser pulse in the round trip to and from the target and use this to calculate the range to the target and the corresponding focus position of the receive optics. Alternatively, a separate laser rangefinder, acoustic rangefinder, image-based system designed to peak spatial frequency in the image, or other auto-focusing means may be used separately, or in conjunction with the pulse-echo laser rangefinder described above.

The ranging requirement for focus control may be substantially more demanding than for zoom and iris control.

Instructions for a model based algorithm used to discriminate the ridges from valleys may reside in processor 250, or in a separate computer-readable physical storage medium. Fingerprint image 270 may be output from processor 250. Output image 270 may be stored in memory (or database), displayed, printed, etc. Depending on the needs of law enforcement or government personnel, fingerprint image 270 may be run through a database of fingerprint images, to identify suspects and/or terrorists.

Figure 3:
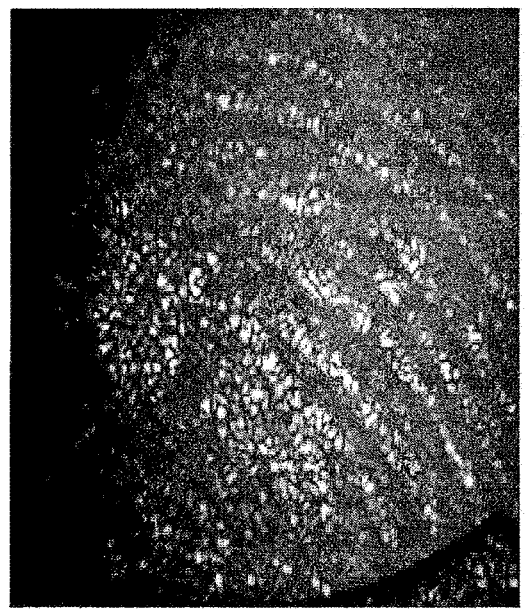
FIG. 3 shows a photograph of one detailed speckle pattern of an exemplary fingerprint.

FIG. 3 shows a photograph of detailed speckle pattern 300 of a fingerprint. As shown, speckle pattern 300 includes a random intensity pattern produced by the mutual interference of a set of wavefronts. Regions of high speckle granularity correspond to the ridges, where the depth across a pixel is less than the coherence length of the optical source. Regions of low intensity variation correspond to the valleys, where the depth across a pixel is greater than the coherence length of the source and where the speckle features are averaged. In one implementation, speckle pattern 300 was formed using a QPhotonic QSDM-915 laser diode manufactured by Laser Diodeaser, Inc., as the laser source. This laser was configured to have a center wavelength of about 909 nm, a spectral width of about 44 nm, and a coherence length of about 8.3 $\mu$m. The receiver optics were configured to have a focal length of about 75 mm, a working distance of about 180 mm, a variable aperture, and a depth of focus of about 3.5 mm. This yielded a resolution of approximately 18.5 pixels between adjacent ridges 12.

Figure 4:
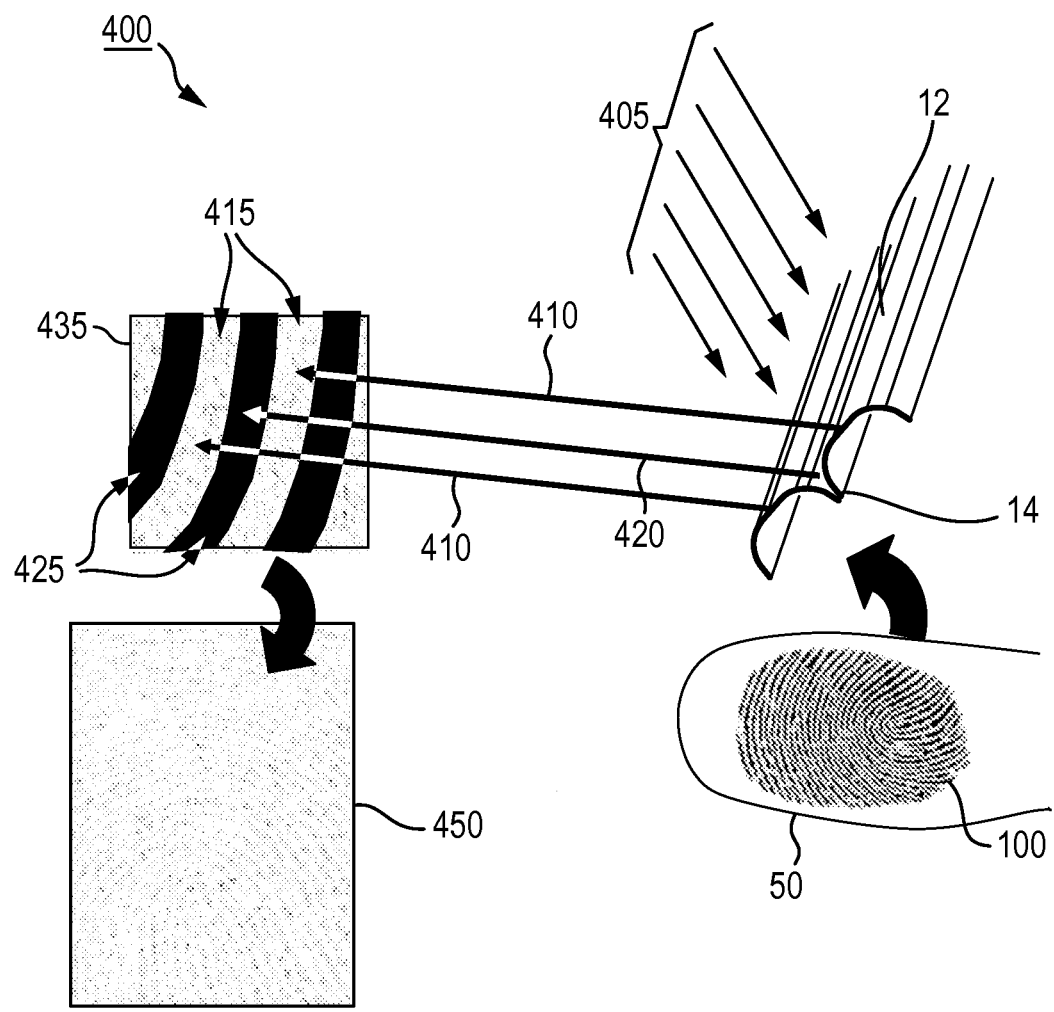
FIG. 4 shows an exemplary method for textured pattern sensing in accordance with an embodiment.

FIG. 4 shows an exemplary method 400 for detecting a textured pattern in accordance with an embodiment.

Electromagnetic radiation 405 emitted, for instance, from a laser transmitter 220 (FIG. 2) may be directed towards a textured pattern from which it is reflected. Laser transmitter 220 may emit partially-coherent laser light of a specific coherence length. Note, for ease of clarity, radiation absorbed by finger 50 and/or reflected in directions other than toward detector surface 435 has been omitted.

In the embodiment shown, the textured pattern is of fingerprint 100 of finger 50, and includes a unique configuration of papilla ridges 12 and valleys 14 which define an individual's fingerprint. Of course, other textured patterns may be similarly detected. Region 435 shows a portion of fingerprint 100 imaged on focal plane of optical detector 235 (FIG. 2).

When textured pattern sensing system 200 is trained on a target finger 50, each relatively flat papillary ridge 12 will reflect radiation 410 that will register as a sharp speckle pattern 415, with a granularity of the order of the optical detector's diffraction-limited resolution (i.e., approximately equal to the laser wavelength divided by the receiver aperture diameter in units of radians). On the other hand, each valley region 14 between papillary ridges 12 will reflect radiation 420 that will register as being substantially uniform region 425 (i.e., constant mid-level intensity, with no distinguishing features, due to speckle averaging). This speckle averaging in valley regions 14 occurs because the physical depth of the sloped valleys region 14, as imaged within a single pixel, is greater than the coherence length of a partially-coherent laser transmitter beam. An algorithm may be used to discriminate the relatively flat ridge regions form the slope valley regions using processor 250. The algorithm may be a pattern recognition algorithm.

Fingerprint image 450 may be output from processor 250. Ridges 12 appear as "lighter" areas, and valleys 14 appear as "darker" areas. The contrast between the darker and lighter areas forms an image of the textured surface. In this case, the image detected corresponds to fingerprint 100.

One specification established for the scanning resolution for exchange of fingerprint information specifies 19.96 pixels per millimeter (ppmm). See "American National Standard for Information Systems—Data Format for the Exchange of Fingerprint, Facial, and Scar Mark & Tatoo (SMT) Information," *ANSI/NIST-ITL* 1-2000, p. 5, 2000. This corresponds to approximately a 0.050 mm pixel spacing, or an average of about 8.7 pixels between adjacent ridges 12. A slightly higher resolution corresponding of about 12 pixels between adjacent ridges 12 may be desirable (or 0.0363 mm pixel spacing) to provide good speckle contrast. This may provide 4 full pixels across each valley 14, to sufficiently define the speckle-average region clearly for the pattern recognition algorithm. For a normally incident finger and a sensor-to-target distance of about 3 meters, the desired angular resolution of the sensor may be about 12.1 microradians.

Achieving this resolution, the pixel size is matched to the speckle feature size ($\lambda/D$). In one implementation, this may be achieved using a gallium arsenide (GaAs) diode laser having a wavelength of 904 nm and receiver optics of approximately 7.5 cm (2.9 inch) diameter. This is sufficiently small for clandestine surveillance.

Figure 5:
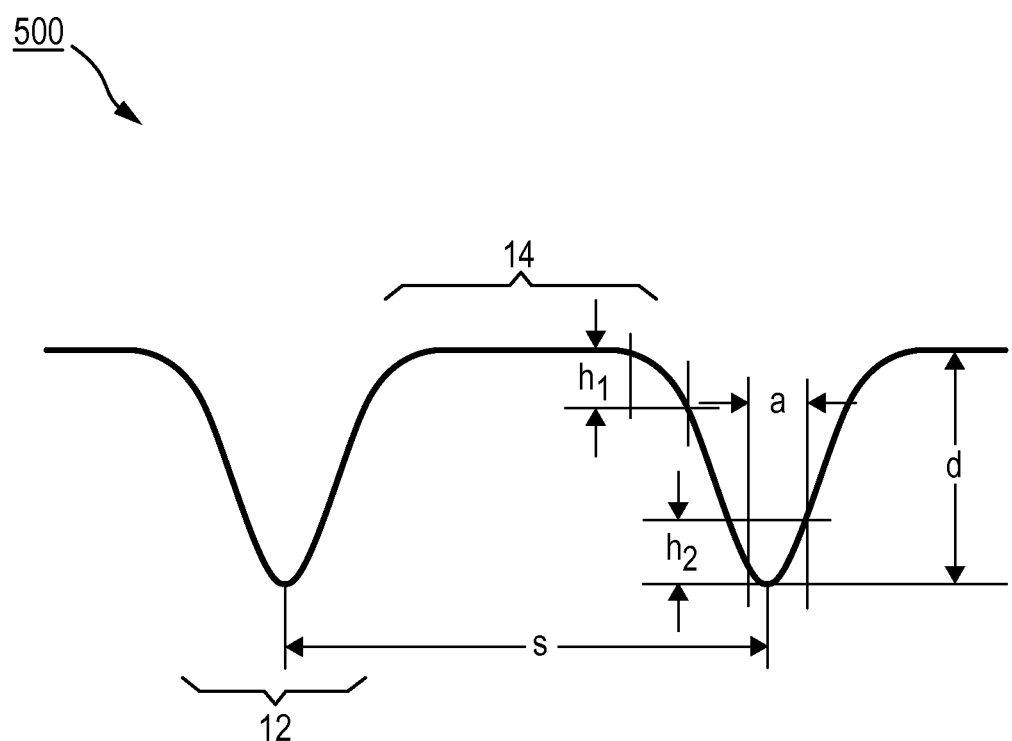
FIG. 5 shows key parameters of a model for fingerprint topography that are used to estimate the coherence length of a partially-coherent laser transmitter in accordance with an embodiment.

FIG. 5 shows key parameters of model 500 for fingerprint topography that are used to estimate the coherence length of the partially-coherent laser transmitter in accordance with an embodiment.

Adjacent valleys 12 are assumed to be spaced apart by a distance s, with a depth d from surface ridges 14. Assuming that the local topography of the fingerprint is hyper-sinusoidal, the height (h) at any point (x) across the cross-section of the dermal papillae may be characterized according to equation (1) as follows:

$$h = d(1 - \sin^{10}(\pi x/s)) \quad (1)$$

This equation may be a good fit to the outer scale cross-sectional data in FIG. 1a. The inner-scale roughness of the finger surface, which is responsible for its diffuse reflection characteristic, may be modeled by adding a random variation in height with a root mean square (RMS) amplitude of 1 micrometer. Exemplary parameters illustrated in FIG. 5 are as follows:

d=depth of valley=0.059 mm
s=spacing between valleys=0.436 mm
$\lambda$=wavelength=904 nm
a=pixel size<<s (let a=s/12=0.0363 mm)
$h_1$=minimum height variation across pixel at edge of valley<$l_c$
$h_2$=minimum height variation across pixel at middle of valley>$l_c$
$l_c$=laser coherence length (m)=0.64 c/$\delta v$
c=speed of light=$3 \times 10^8$ m/s
$\delta v$=laser linewidth (Hz)

The laser coherence length may be selected through a parametric tradeoff. For instance, a design or simulation tool, such as MATLAB® software may be used for optimizing one or more parameters. Using the above parameter values, the minimum depth of the surface texture within the 4 pixels nearest the valley under worst case conditions regarding pixel position or shift is as follows:

$h_{1MIN}=h_{2MIN}$=0.234 d=0.014 mm
$l_c$=0.014 mm
$\delta v$=0.64 c/$l_c$=13.9 THz
v=331 THz (for 904 nm laser wavelength)
$\Delta\lambda=\lambda(\delta v/v)$=37.9 nm Under these conditions, the approximate depth-of-field may be about 3.54 mm, which sets the precision of the rangefinder function. This assumes a circle of confusion of ½ pixel or 0.0182 mm, and a typical pixel pitch of the camera FPA of 0.015 mm. To achieve this precision using the partially-coherent laser transmitter as the rangefinder source in a pulse-echo rangefinder configuration (not shown) may require a pulse width on the order of about 180 picoseconds, very high speed constant fraction discrimination circuit (or equivalent) and high speed range counting electronics. It may, therefore, be more advantageous to use a separate coherent laser rangefinder or other means known in the art of camera autofocus control (e.g., acoustic rangefinder or image-based autofocus system designed to peak the spatial frequency in the image), or a combination thereof for this focus control function. A zoom capability may also be desired to maintain a near constant pixel spacing between papillary ridges. However, the ranging requirement for focus control will be substantially more demanding than for zoom control. The physical effective focal length may be accommodated with a telephoto lens system to minimize the physical size of the sensor.

FIGS. 6a-6d show images of a simulated fingerprint according to an embodiment.

Figure 6A:
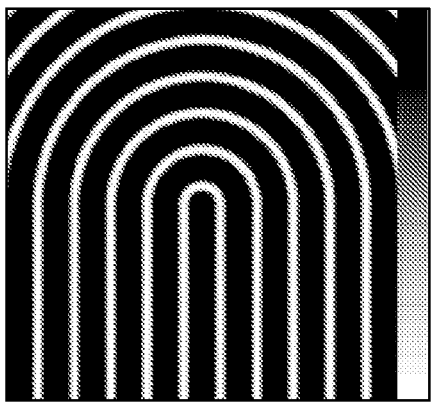
FIGS. 6a-6d show processed images of a typical fingerprint in accordance with an embodiment.

FIG. 6a shows a textured pattern used by a MATLAB® script to simulate the three-dimensional textured surface of a typical finger, wherein intensity represents the height of the surface. The outer-scale ridges and valleys are modeled as a hypersinusoid and the inner-scale roughness is modeled by adding a random height variation with a 1 micrometer RMS amplitude. The high points in the pattern (ridges) are black in the figure; and the low points (valleys) are white. A scale is shown at the right of FIG. 6a, the full range for which is 0.06 mm. The MATLAB® script was also used to simulate the functionality of textured pattern sensing system 200.

Figure 6B:
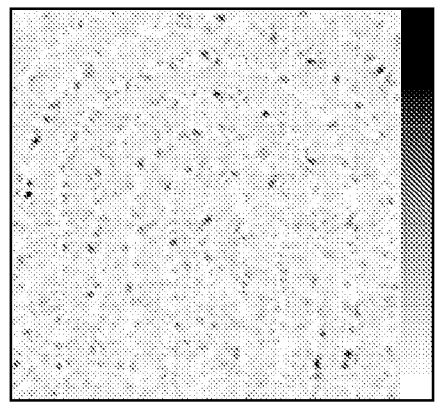

FIG. 6b shows the MATLAB® simulation of the speckle image as may be detected by optical detector 235 of textured pattern sensing system 200 corresponding to the simulated fingerprint texture pattern of FIG. 6a. For this simulation, the center wavelength of laser transmitter 220 is 904 nm and the spread in transmitter operating wavelengths is modeled by using 40 discrete transmitter lines weighted with a Gaussian amplitude profile with a line width of 166 nm at the half power points, corresponding to a spectral separation of 60.9 THz. The coherence length is given by $l_c$=0.64 c/$\delta v$ which is 3.15 micrometers. This MATLAB® program models the phase of the received electromagnetic radiation within each pixel as the average of the phases at the center point within each sub-element of a 4×4 element array used to model that pixel, therefore the aperture averaging is less complete than would be the case for a contiguous pixel within optical detector 235, and the height variation across the pixel is only half the height variation across a "real" pixel. For this reason, the MATLAB® program under-predicts the coherence length required to provide good contrast between ridge and valley features (0.00315 mm simulated vs. 0.014 mm calculated).

Figure 6C:
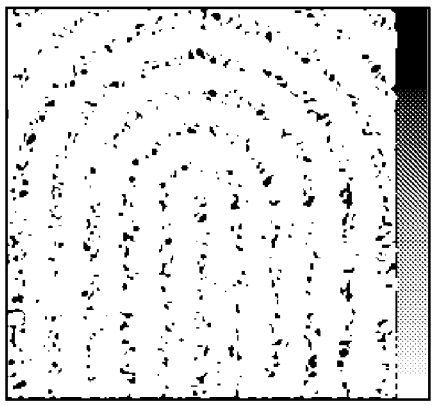
Figure 6D:
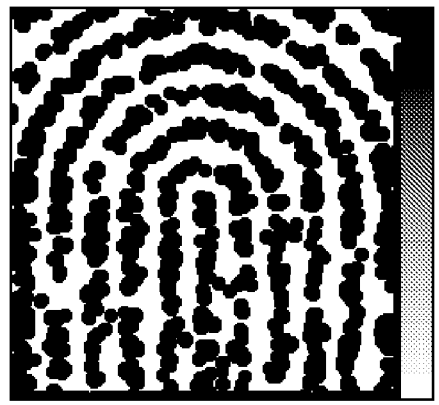

FIG. 6c shows the result of high/low threshold enhancement of the speckle image where all pixels having an intensity value between 0.8 and 5.0 times the standard deviation in pixel intensity are set to zero intensity (white in figure) and all pixels having intensity values outside this range are set to maximum intensity (black). This process largely removes the speckle averaged values associated with the papillary valley features of target finger 100. FIG. 6d shows the result of point-expansion enhancement of the thresholded image of FIG. 6c where all pixels in a five pixel radius surrounding each pixel with a maximum intensity value is also set to maximum intensity. This process further enhances the ridge features by more completely filling in these features without significantly changing the valley features. The threshold and point expansion processes shown in FIGS. 6c and 6d as well as other image enhancement processes may be performed by processor 250 of texture pattern sensing system 200.

Figure 7:
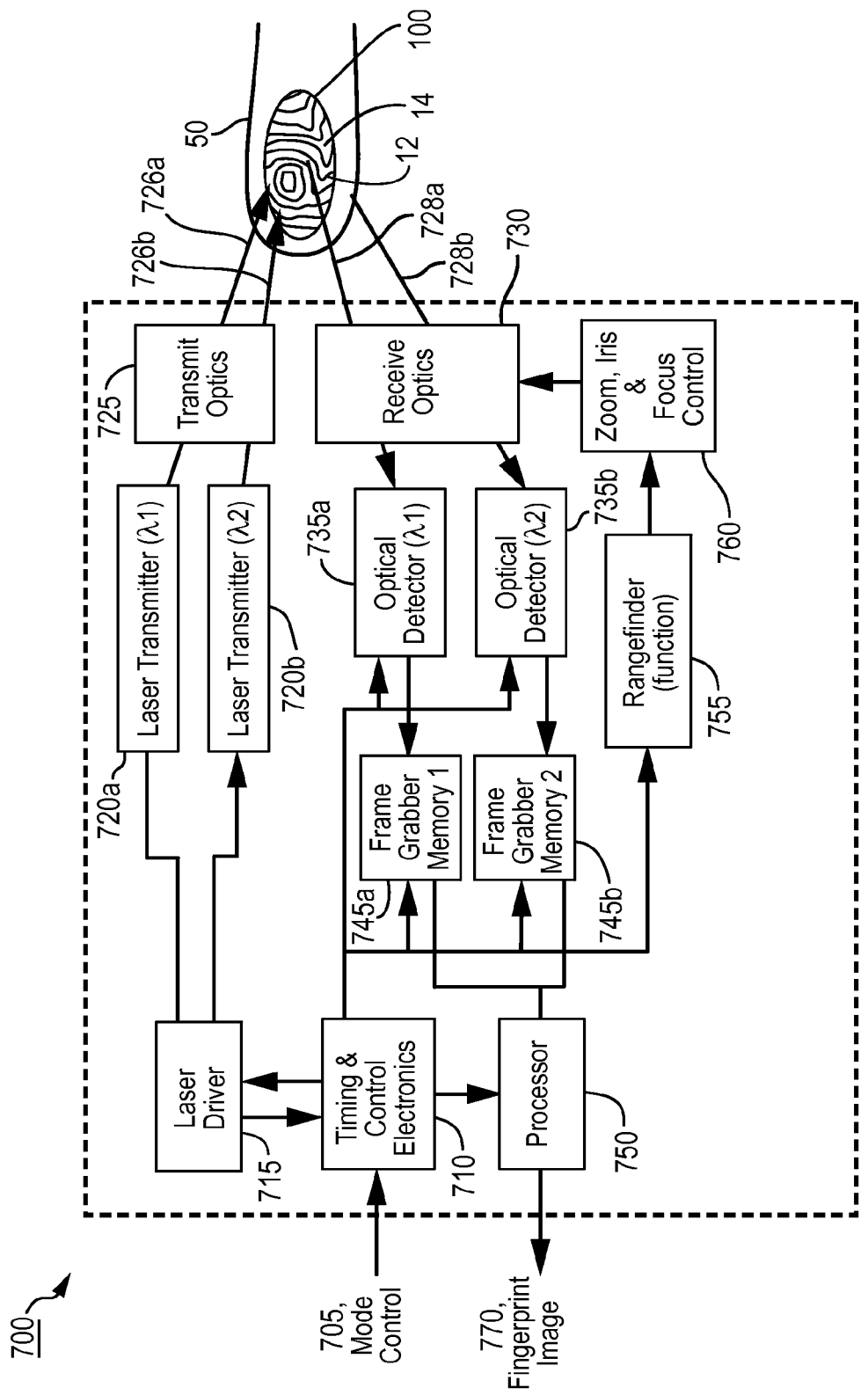
FIG. 7 shows a block diagram of an another exemplary textured pattern sensing system in accordance with an embodiment.

FIG. 7 is a block diagram of a texture pattern sensing system 700 that used two-partially-coherent laser transmitters with frame subtraction, in accordance with another embodiment.

System 700 may be configured for remote, covert fingerprint detecting similar to system 200 (FIG. 2). In this embodiment, two laser transmitters 720a, 720b may be used as the illumination source for target finger 50, the return signals from each 728a, 728b are imaged using two optical detectors 735a, 735b, each connected to a frame grabber memory 745a, 745b. All other related elements may be similarly configured as shown in system 200 (FIG. 2).

For instance, laser driver 715 provides input to laser transmitters 720a, 720b which are configured to provide illumination source for target finger 50. In one implementation, laser transmitters 720a, 720b may be a partially-coherent pulsed solid-state laser transmitter which operates in the near infrared wavelength spectra. Although, it will be appreciated that various spectra could be used in accordance with the embodiments disclosed herein, such as visible, ultraviolet (UV), or infrared (IR). The separation in operating frequency between laser transmitters 720a, 720b is selected such that the speckle patterns associated with the relatively flat ridge regions are not well correlated. The temporal width of the laser pulse should be sufficient to "freeze" the motion of system 700 and target finger 50. A pulse, for instance, having a width shorter than about 100 µs should be sufficient for most remote, covert fingerprinting scenarios. Transmit optics 725 may be provided that are configured to shape, focus, and/or correct aberrations of the beam of electromagnetic radiation (light) 726a, 726b from respective laser transmitters 720a, 720b and direct them towards target finger 50.

Speckle patterns 728a, 728b resulting from scattering the partially-coherent laser transmitter beam from the textured surface, such as fingerprint 100, are collected by receiver optics 730 which images speckle patterns 728a, 728b onto respective optical detectors 735a, 735b. Receiver optics 730 may include a narrow bandpass optical filter to minimize reflected solar background noise. Speckle patterns 728a, 728b are imaged by optical detector 735a, 735b. In some implementations, optical detectors 735a, 735b may be a charge-coupled device (CCD), photodiode array, camera or other detector.

The output of frame grabbers 745a, 745b may be sent to one or more processors 750 which may be configured to perform image processing. Frame grabber 745 is configured to capture individual images generated by the optical detector 735. In some embodiments, the speckle pattern imaged by optical detector 735 may be sent directly to processor 750 which is configured to extract features (e.g., papillary ridges and valleys of the target finger) as a fingerprint image.

Processor 750 may utilize one or more algorithms, including those known in the art of forensic and biometric sciences, to extract higher-level attributes from a fingerprint. Rangefinder 755 may also be included, which drives zoom, iris and focus control servo mechanism 760 attached to receiver optics 730 to (1) maintain fingerprint image 700 in sharp focus on optical detectors 735a, 735b, (2) maintain a near constant pixel spacing between papillary ridges 12, and/or (3) maintain a near constant ratio between the diameter of the receiver point spread function and the size of papillary features in the image plane of the optical detectors 735a, 735b. To maintain focus, the accuracy of rangefinder 755 may be comparable to the depth-of-focus of receiver optics 730. In some implementations, range finder 755 may use a pulse from laser transmitter 720, a fast photodiode (not shown), and a conventional range counter to measure the time of flight of the laser pulse in the round trip to and from the target and use this to calculate the range to the target and the corresponding focus position of the receive optics. Alternatively, a separate laser rangefinder, acoustic rangefinder, image-based system designed to peak spatial frequency in the image, or other auto-focusing means may be used separately, or in conjunction with the pulse-echo laser rangefinder described above.

Timing and control electronics 710 direct laser driver 715 and laser transmitter 720 to fire and manage the timing of the bias and readout cycles for the optical detectors 735a, 735b. Such systems are known in the art for controlled laser pulse timing. Separate mode control 705 may be used to switch the timing of the laser driver 715 and the frame rate and or format of the optical detectors 735a, 735b based on the target size, range, reflectivity, surface texture characteristics, atmospheric transmission, and ambient lighting conditions. For example, a dark target surface may require greater pulse energy or a longer dwell time (CW source) to achieve the desired signal-to-noise ratio relative to a lighter target surface. If the laser is a continuously-pumped and Q-switched solid state laser, the Mode Control 705 may command the Timing and Control Electronics 710 to lengthen the period between laser pulses resulting in a higher laser pulse energy and also to reduce the frame rate of the optical detector to maintain synchronization with the new laser pulse rate.

The pointing function of textured pattern sensing system 700 may be controlled by using a separate imager and video tracker system (not shown) which may be configured to point the sensor line-of-sight (LOS) toward target finger 50. This pointing function might also be accomplished by the human operator using a small display, such as, for example, a liquid crystal display (LCD) device. With the imager, video tracker, and LOS pointing means, the field-of-view (FOV) of textured pattern sensing system 200 may need only be the size of the target suspect's palm.

The ranging requirement for focus control may be substantially more demanding than for zoom and iris control. Instructions for a model based algorithm used to discriminate the ridges from valleys may reside in processor 750, or in a separate computer-readable physical storage medium. Fingerprint image 770 may be output from processor 750. Output image 770 may be stored in memory (or database), displayed, printed, etc. Depending on the needs of law enforcement or government personnel, fingerprint image 770 may be run through a database of fingerprint images, to identify suspects and/or terrorists.

A frame subtraction function may be performed by processor 750 wherein the image stored in frame grabber memory 745a is subtracted from the image of that stored in frame grabber memory 745b, resulting in a single frame of imagery. Additional processing may be performed to level-balance the two images before subtraction, such that the intensity in the valley regions of the image in 745a is approximately equal to that in 745b. The result is that the speckle-averaged regions corresponding to the valley features will essentially vanish in the subtracted frame, leaving a highly detectable speckle pattern at the ridge features that is easier to process.

Figure 8:
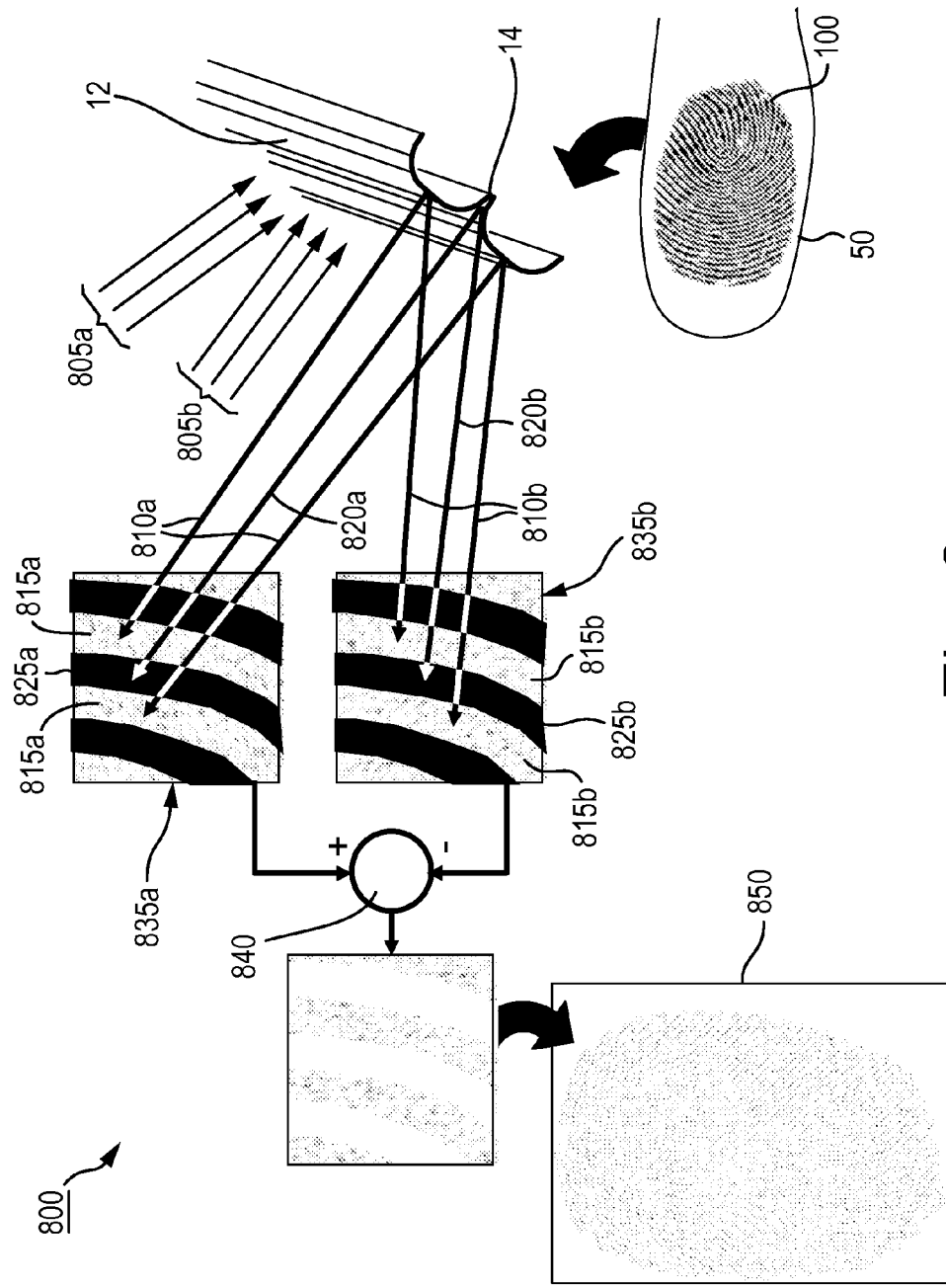
FIG. 8 depicts another exemplary method for textured pattern sensing in accordance with an embodiment.

FIG. 8 shows textured pattern sensing method 800 using two partially-coherent laser transmitters with frame subtraction in accordance with an embodiment.

When system 700 is trained on target finger 50, each relatively flat papillary ridge 12 will register as a sharp speckle pattern and each valley 14 will register as a substantially uniform intensity.

If the center wavelengths of the two partially-coherent laser transmitters are sufficiently separated, the speckle patterns will be uncorrelated between the two optical detectors' images, and the subtracted frame will show granular intensity patterns similar to the original speckle patterns, but with some higher spatial frequency components. The valley regions will subtract to a near-zero intensity, provided the two camera images are properly corrected for pixel-to-pixel nonuniformity and overall intensity balance. This subtraction process may provide improved contrast, making the image enhancement and feature extraction more robust.

Electromagnetic radiation 805a, 805b emitted, for instance, from partially-coherent laser transmitters 720a, 720b (FIG. 7), may be directed towards a textured pattern, in this case fingerprint 100, which is reflected. Note, for ease of clarity, radiation absorbed by finger 50 and/or reflected in directions other than toward detector surfaces 735a, 735b has been omitted.

In the embodiment shown, the textured pattern is fingerprint 100 of finger 50, including a unique configuration of papilla ridges 12 and valleys 14 which define an individual's fingerprint. Of course, other textured patterns may be similarly detected. Regions 835a, 835b show portions of fingerprint 100 imaged on focal plane of optical detectors 735a, 735b, (FIG. 7), respectively.

When the textured pattern sensing system is trained on a target finger 50, each relatively flat papillary ridge 12 will reflect radiation 810a, 810b, which will register as sharp speckle patterns 815a, 815b, with a granularity on the order of the optical detector's diffraction-limited resolution (i.e., approximately equal to the laser wavelength divided by the receiver aperture and quantified in units of radians). On the other hand, each transition valley region 14 between papillary ridges 12 will reflect radiation 820a, 820b which will register as being substantially uniform regions 825a, 825b (i.e., constant mid-level intensity with no distinguishing features due to speckle averaging).

The intensity patterns of the resulting images produced from reflected radiation 810a, 810b may be subtracted from reflected radiation 820a, 820b, respectively, and the absolute value taken, as shown at 840, resulting in fingerprint image 850. This subtraction process will produce a high contrast between the ridge and valley regions if three conditions are met. First, the physical depth of the sloped valleys regions 14 of fingerprint 100, as imaged within a single pixel, is greater than the coherence length of each partially-coherent laser transmitter 220a, 220b. Second, physical depth of the relatively-flat ridge region 12, as imaged within a single pixel, is less than the coherence length of each partially-coherent laser transmitter beam. Third, the separation in center operating frequency between the two partially-coherent laser transmitters is sufficiently large as given by the following equation, where $v_1$ and $v_2$ are the center frequencies of the transmitters, c is the speed of light, and d is the texture depth of the relatively flat ridge region. Given a texture depth of about 1 micrometer, the frequency separation should be greater than 37.5 THz. This is equivalent to a wavelength separation of 102 nm at an operating wavelength of 904 nm.

$$v_2 - v_1 > c/(8d)$$

An algorithm may be used to discriminate the relatively flat ridge regions from the slope valley regions used by processor 750. The algorithm may be a pattern recognition algorithm.

Figure 9A:
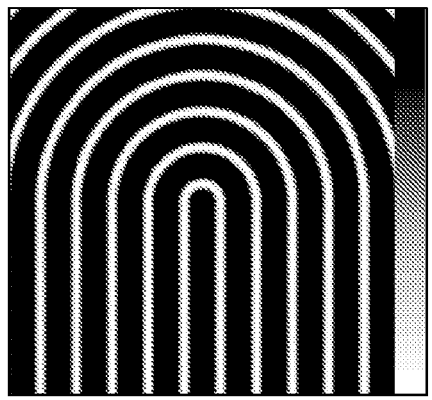
FIGS. 9a-9d show processed images of a typical fingerprint in accordance with an embodiment.
Figure 9B:
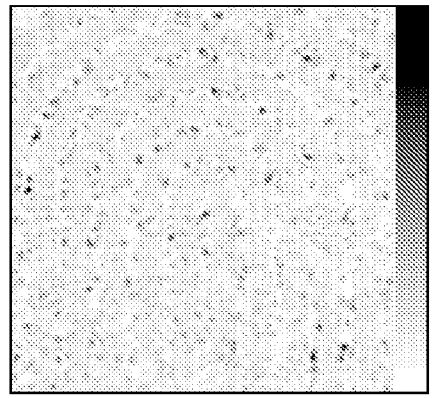
Figure 9C:
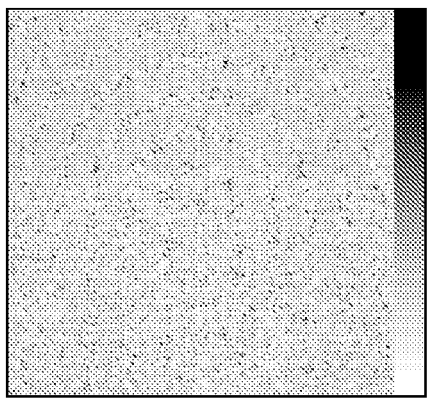

FIGS. 9a-9d show images of a typical target finger derived from MATLAB® simulation of the second embodiment. FIG. 9a shows the same textured pattern as FIG. 6a used by a MATLAB® script to simulate the three-dimensional textured surface of a typical finger. FIG. 9b shows the same MATLAB® simulation of the speckle image as FIG. 6b as may be detected by optical detector 735a. FIG. 9c shows a MATLAB® simulation of the speckle image as may be detected by optical detector 735b. For this simulation, the center wavelength of laser transmitter 720b is 631 nm and the spread in transmitter operating wavelengths is modeled by using 40 discrete transmitter lines weighted with a Gaussian amplitude profile with a line width of 80.8 nm at the half power points, corresponding to the same spectral separation of 60.9 THz and the same coherence length of 3.15 micrometers.

Figure 9D:
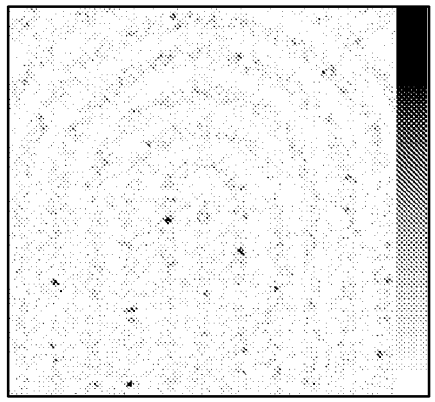

FIG. 9d shows a processed image based on subtracting normalized pixel intensity values within the individual speckle images detected by optical detectors 735a, 735b of texture pattern sensing system 700 then taking the absolute value of the resultant pixel values using a MATLAB® script. The ridge features shown in FIG. 9d are clearly distinguishable without further image enhancement, showing the advantage of frame subtraction in accordance with this textured pattern sensing system implementation 700.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A system for imaging a textured surface comprising:
a partially coherent light source configured to project electromagnetic radiation onto the textured surface, wherein the projected beam generates first radiation diffusely scattered from a first portion of the textured surface to form a speckle pattern, and second radiation diffusely scattered from a second portion of the textured surface which is substantially uniform in intensity; and
an optical detector configured to receive the first and second reflected radiation from the textured surface,
wherein a coherence length of the partially coherent light source is greater than a depth of the first region and less than a depth of the second region, when imaged within a single pixel of the optical detector.

2. The system according to claim 1, wherein the light source is a pulsed laser.

3. The system according to claim 1, wherein the light source is configured to project electromagnetic radiation that is generally undetectable by a human under ambient conditions.

4. The system according to claim 1, further comprising: a processor configured to generate an image of the textured surface from the first and second diffusely scattered radiation.

5. The system according to claim 1, further comprising: a second light source configured to project a second electromagnetic radiation beam onto the textured surface, wherein the second projected beam generates third radiation diffusely scattered from the first portion of the textured surface to form a speckle pattern, and fourth radiation diffusely scattered from the second portion of the textured surface which is substantially uniform in intensity pattern; and a second optical detector configured to receive the third and fourth reflected radiation from the textured surface.

6. The system according to claim 5, further comprising: a processor configured to generate an image of the textured surface from the third and fourth diffusely scattered radiation.

7. The system according to claim 6, wherein the processor is configured to combine an image of the first and second diffusely scattered radiation and the image of the third and fourth diffusely scattered radiation.

8. The system according to claim 7, wherein the processor uses frame subtraction so as to substantially eliminate imagery features from combined image of said second portion of the textured surface.

9. The system according to claim 5, wherein the second electromagnetic radiation beam has a different wavelength than the first electromagnetic radiation beam.

10. The system according to claim 5, wherein a coherence length of said first and second light sources is greater than a depth of the first region and less than a depth of the second region, when imaged within a single pixel of the optical detector.

11. A method for imaging a textured surface, comprising: projecting a partially coherent beam of electromagnetic radiation onto the textured surface, wherein the projected beam generates first radiation diffusely scattered from a first portion of the textured surface to form a speckle pattern, and second radiation diffusely scattered from a second portion of the textured surface which is substantially uniform in intensity; and receiving, with an optical detector, the first and second reflected radiation from the textured surface, wherein a coherence length of a partially coherent light source used for projecting the partially coherent beam of electromagnetic radiation is greater than a depth of the first region and less than a depth of the second region when imaged within a single pixel of the optical detector.

12. The method according to claim 11, further comprising generating the electromagnetic radiation with a pulsed laser.

13. The method according to claim 11, wherein the projected electromagnetic radiation is generally undetectable by a human under ambient conditions.

14. The method according to claim 11, further comprising: processing the first and second diffusely scattered radiation, with a processor, to generate an image of the textured surface.

15. The method according to claim 11, further comprising: projecting a second beam of electromagnetic radiation onto the textured surface, wherein the projected beam generates third radiation diffusely scattered from the first portion of the textured surface to form a speckle pattern, and second radiation diffusely scattered from the second portion of the textured surface which is substantially uniform in intensity; and receiving, with a second optical detector, the third and fourth diffusely scattered radiation from the textured surface.

16. The method according to claim 15, further comprising: processing the third and fourth diffusely scattered radiation, with a processor, to generate an image.

17. The method according to claim 16, wherein the processing comprising combining an image of the first and second diffusely scattered radiation and the image of the third and fourth diffusely scattered radiation.

18. The method according to claim 17, wherein the processing comprises frame subtraction so as to substantially eliminate imagery features from combined image of said second portion of the textured surface.

19. The method according to claim 15, wherein the second electromagnetic radiation beam has a different wavelength than the first electromagnetic radiation beam.

* * * * *